United States Patent
Burski et al.

(10) Patent No.: US 10,410,681 B1
(45) Date of Patent: Sep. 10, 2019

(54) PRINTED CIRCUIT BOARD SNAP-IN MOUNTING

(71) Applicant: Seagate Technology LLC, Cupertino, CA (US)

(72) Inventors: Brian Lee Burski, Niwot, CO (US); Jeffrey Leonard Bruce, Longmont, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 16/042,757

(22) Filed: Jul. 23, 2018

(51) Int. Cl.
  *G11B 33/02* (2006.01)
  *G11B 5/84* (2006.01)
(52) U.S. Cl.
  CPC ............ *G11B 33/02* (2013.01); *G11B 5/8404* (2013.01); *G11B 2220/2516* (2013.01)
(58) Field of Classification Search
  None
  See application file for complete search history.

(56) References Cited

U.S. PATENT DOCUMENTS

| | | | | |
|---|---|---|---|---|
| 3,213,500 A | * | 10/1965 | Thompson | F16B 21/086 174/164 |
| 3,704,486 A | * | 12/1972 | Blacklock | F16B 5/0642 174/138 D |
| 4,276,460 A | * | 6/1981 | Haesly | H01H 1/36 200/11 DA |
| 4,297,769 A | * | 11/1981 | Coules | F16B 21/086 174/138 D |
| 4,502,193 A | * | 3/1985 | Harmon | F16B 19/1081 174/138 D |
| 4,664,458 A | * | 5/1987 | Worth | H01R 12/52 174/138 D |
| 5,060,100 A | * | 10/1991 | Mihara | G11B 5/4853 360/245.8 |
| 5,580,203 A | * | 12/1996 | Read | H05K 7/12 411/508 |
| 5,706,559 A | * | 1/1998 | Oliver | F16B 21/088 24/115 M |
| 6,114,757 A | * | 9/2000 | DelPrete | H01L 23/32 257/678 |
| 6,501,030 B1 | * | 12/2002 | Parizi | H01R 12/585 174/250 |
| 6,702,592 B1 | | 3/2004 | Harden et al. | |
| 2003/0081357 A1 | | 5/2003 | Hong et al. | |

FOREIGN PATENT DOCUMENTS

| | | | | |
|---|---|---|---|---|
| DE | 3939746 A1 | * | 6/1991 | ............... H05K 7/12 |
| DE | 29622184 U1 | * | 2/1997 | ............... G06F 1/183 |
| GB | 2204740 A | * | 11/1988 | ........... H05K 3/3447 |
| GB | 2311033 A | * | 9/1997 | ............. B29C 65/58 |
| JP | 04349284 A | * | 12/1992 | |
| JP | 08007556 A | * | 1/1996 | |
| JP | 09266021 A | * | 10/1997 | |
| JP | 11233910 A | * | 8/1999 | |
| JP | 2006294170 A | * | 10/2006 | ........... G11B 25/043 |
| JP | 2017195029 A | * | 10/2017 | |

* cited by examiner

*Primary Examiner* — William J Klimowicz
(74) *Attorney, Agent, or Firm* — Faegre Baker Daniels LLP

(57) ABSTRACT

A base deck of a hard drive and methods for making a base deck is disclosed. The base deck includes a plurality of multi-pronged snaps integrally formed with the base deck. Each prong of the plurality of multi-pronged snaps includes a rounded distal portion.

20 Claims, 4 Drawing Sheets

PRINTED CIRCUIT BOARD SNAP-IN MOUNTING

SUMMARY

In certain embodiments, a base deck of a hard drive is disclosed. The base deck includes a plurality of multi-pronged snaps integrally formed with the base deck. Each prong of the plurality of multi-pronged snaps includes a rounded distal portion.

In certain embodiments, a method of manufacturing a base deck of a hard drive is disclosed. The method includes forming a multi-pronged snap into the base deck. The method also includes forming a rounded distal portion into each prong of the multi-pronged snap.

In certain embodiments, a hard drive includes a base deck and a printed circuit board. The base deck is coupled to a top cover to form an enclosure in which multiple hard drive components are positioned. The base deck includes a plurality of multi-pronged snaps integrally formed with the base deck. Each prong of the plurality of multi-pronged snaps includes a rounded distal portion. The printed circuit board assembly is coupled to the plurality of multi-pronged snaps.

Figure 1:
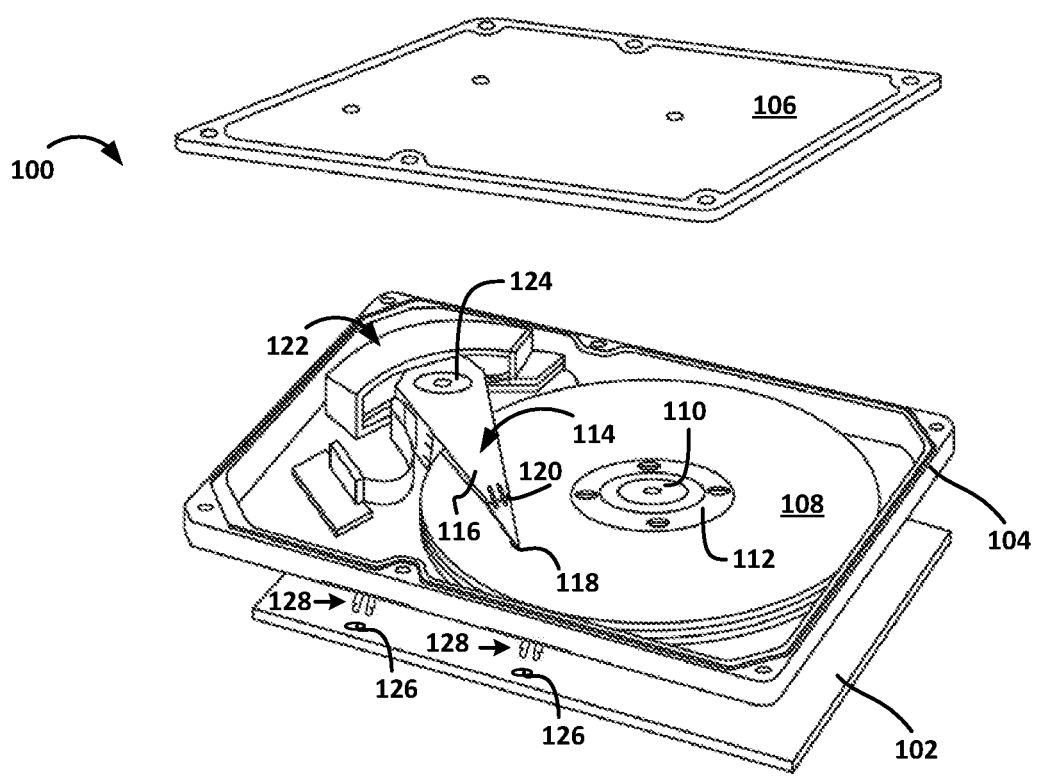
FIG. 1 shows an exploded, perspective view of a hard drive including a multi-pronged snap and a printed circuit board assembly (PCBA), in accordance with certain embodiments of the present disclosure.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope the appended claims. The use of the word "substantially" as a qualifier to certain features or effects in this disclosure is intended to mean that any deviations are within tolerances that would normally be expected by the skilled person in the relevant field.

DETAILED DESCRIPTION

Certain embodiments of the present disclosure are directed to base decks of hard drives and more particularly to a mounting scheme for coupling a printed circuit board assembly (PCBA) to a base deck.

A PCBA is typically coupled to the base deck using PCBA mounting screws. Base decks, however, have limited areas where mounting bosses for the PCBA screws can be located because few areas are thick enough to accommodate screw threads. In addition, the areas of the base deck that have enough material for screw threads decreases as more disks are included in hard drives. To create space for more disks, base decks (and portions thereof) may be designed to be thinner. The embodiments disclosed herein provide a solution to these problems.

FIG. 1 shows an exploded, perspective view of a hard drive 100 and a PCBA 102. The hard drive has a base deck 104 and a top cover 106. The base deck 104 can include a base member with sidewalls that form an internal cavity in which various hard drive components are positioned. The top cover 106 is coupled to the base deck 104 to form an enclosure.

The hard drive 100 includes magnetic recording disks 108 coupled to a spindle motor 110 by a disk clamp 112. The hard drive 100 also includes an actuator assembly 114, which includes a suspension 116 that positions read/write heads 118 over data tracks on the magnetic records disks 108. In some embodiments, the actuator assembly 114 is a dual-stage actuator assembly in which each read/write head 118 is coupled to a microactuator 120 that—in addition to a voice coil motor (VCM) assembly 122—assists in positioning the read/write head 118 over a desired track on the magnetic recording disks 108. Each microactuator 120 can be positioned at least partially on or between the suspension 116 and one of the read/write heads 118. As appreciated by one skilled in the art, the read/write heads 118 may be coupled to the suspension 116 by a head-gimbal assembly (not shown). During operation, the spindle motor 110 rotates the magnetic recording discs 108 while the actuator assembly 114 is driven by the VCM assembly 122 to pivot around a pivot bearing 124. The actuator assembly 114 may be coupled to the pivot bearing 124 by an adhesive or a tolerance ring (not shown).

The hard drive 100 further includes various integrated circuits positioned on and electrically coupled to the PCBA 102. For example, one of the integrated circuits may store a servo control system that controls rotation of the actuator assembly 116 via the VCM assembly 122 and/or controls actuation of the microactuators 120 to position the read/write heads 118 over a desired track on the magnetic recording disks 108 for reading and writing operations. In response to a command to read data from or write data to a track different from where a read/write head 118 is currently positioned (i.e., a track-seeking operation), a current may be applied a voice coil (not shown) of the voice coil motor assembly 122 to rotate the actuator assembly 114 (and therefore the read/write head 118) towards the desired track. The current may be applied to the voice coil in response to a signal from the PCBA 102. In addition to the servo control system, the integrated circuits on the PCBA 102 may include a motor controller (not shown) that provides power to the spindle motor 110 to rotate the magnetic recording disks 108.

In the exemplary embodiment depicted, the PCBA 102 includes a plurality of PCBA mounting holes 126. The PCBA mounting holes 126 are used to mount the PCBA 102 to the base deck 104. While the PCBA 102 is illustrated as including two PCBA mounting holes 126, the PCBA 102 may include fewer or more PCBA mounting holes 126.

To couple the PCBA 102 to the base deck 104, each of the PCBA mounting holes 126 is sized to receive a multi-pronged snap 128. The multi-pronged snaps 128 are received and snap into the PCBA mounting holes 126 to secure the PCBA 102 to the base deck 104. The multi-pronged snaps 128 extend from an exterior, bottom surface of the base deck 104 and may be integrally formed from the material of the base deck 104. Because the multi-pronged snaps 128 secure the PCBA 102 to the base deck 104, the need to secure the PCBA 102 to the base deck 104 using screws is reduced. Further, because the multi-pronged snaps 128 may be integrally formed from the base deck 104, the illustrated embodiments reduce the need to find areas of the base deck 102 that have adequate material for mounting bosses and/or screw threads.

Figure 2:
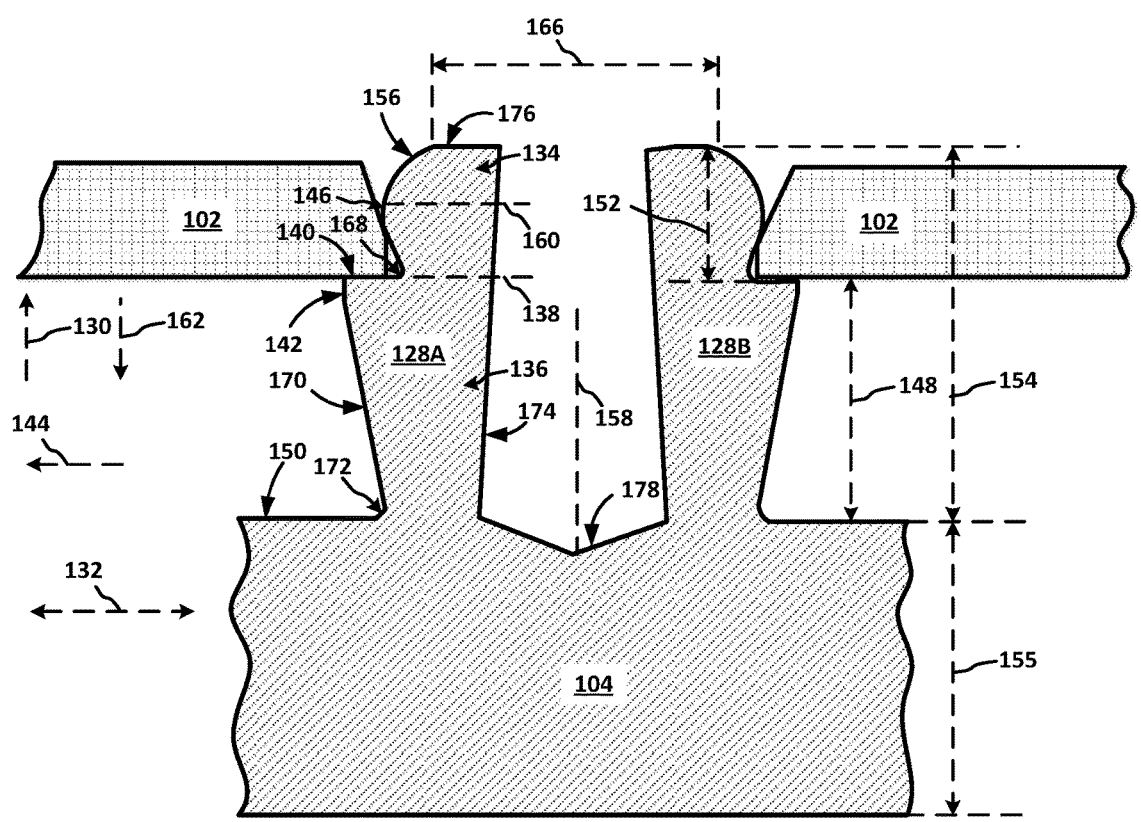
FIG. 2 shows a side sectional view of one of the multi-pronged snaps from FIG. 1, in accordance with certain embodiments of the present disclosure.

Referring to FIG. 2, a side sectional view of one of the multi-pronged snaps 128 from FIG. 1 is depicted. As stated above, the multi-pronged snap 128 is received by a mounting hole 126 of the PCBA 102. In the illustrated embodiment, the multi-pronged snap 128 includes a first prong 128A and a second prong 128B. Each prong 128A, 128B projects from the exterior surface of the base deck 104 in a first perpendicular direction 130 substantially perpendicular to the base deck plane 132. While the illustrated embodiment includes two prongs 128A, 128B, in other embodiments the multi-pronged snap 128 may include more than two prongs 128A, 128B. For example, in certain embodiments, the base deck 104 includes at least four prongs. In certain embodiments, the base deck 104 includes two to ten prongs.

Each prong 128A, 128B includes a distal portion 134 and a proximal portion 136. In embodiments, the junction 138 separates the distal portion 134 from the proximal portion 136. At the junction 138, each prong 128A, 128B may include a catch 140. The catch 140 of the prong 128A may include an outermost exterior surface 142 that extends in a first parallel direction 144 by a distance greater than the distal portion's outermost exterior surface 146 of the prong 128A (and vice versa for the prong 128B). Additionally or alternatively, the catch 140 may include a surface that is substantially parallel to the base deck plane 132. As such, the catch 140 provides a platform for the PCBA 102 and restricts the distance 148 at which the PCBA 102 is separated from the base deck surface 150. The distance 148 also corresponds to the height of the proximal portion 136 and may be referred to herein as the proximal portion height 148. In exemplary embodiments, the proximal portion height 148 may range from 30 mils to 100 mils. In even more exemplary embodiments, the proximal portion height 148 may range from 50 mils to 80 mils. And in even more exemplary embodiments, the proximal portion height 148 may be approximately 65 mils.

In at least some embodiments, the distal portion height 152 may be less than the proximal portion height 148. Additionally or alternatively, the distal portion height 152 may be less than half the prong height 154. The distal portion height 152 may be less than the proximal portion height 148 and/or less than half the prong height 154 to facilitate adequate spacing between the PCBA 102 and the base deck surface 150 while still maintaining an appropriate prong height 154 that does not lead to a number of multi-pronged snaps 128 being broken and/or damage during storage and/or transportation of the base deck 104. Additionally or alternatively, the prong height 154 may be greater than or equal to the base deck thickness 155.

In exemplary embodiments, the distal portion height 152 may range from 20 mils to 60 mils. In even more exemplary embodiments, the distal portion height 152 may range from 30 mils to 50 mils. And in even more exemplary embodiments, the distal portion height 152 may be approximately 40 mils.

As illustrated, the distal portion's exterior surface 156 may be rounded and/or curved. For example, the distal portion's exterior surface 156 may taper towards the multi-pronged snap's centerline 158 as the distal portion's exterior surface 156 transitions away from the distal portion's center portion 160 in the first perpendicular direction 130. Additionally or alternatively, the distal portion's exterior surface 156 may taper towards the multi-pronged snap's centerline 158 as the distal portion's exterior surface 156 transitions away from the distal portion's center portion 160 in the second perpendicular direction 162.

The rounded and/or curved distal portion's exterior surface 156 facilitates seating the PCBA 102 onto the multi-pronged snap 128. That is, due to the distal portion's exterior surface 156 being tapered, locating the PCBA 102 onto the multi-pronged snap 128 may be easier because the mounting hole diameter 164 (depicted in FIG. 3) is greater than the multi-pronged snap's distal end diameter 166. In addition, the distal portion's exterior surface 156 being tapered facilitates sliding the PCBA 102 over the distal portion 134 down to the catch 140.

In addition, the distal portion's exterior surface 156 being tapered facilitates maintaining the PCBA 102 coupled to the multi-pronged snap 128. That is, due to the distal portion's exterior surface 156, an indentation 168 between the distal portion 134 and the catch 140 is created. The PCBA 102 is seated into the indentation 168 and friction between the distal portion 134 and the PCBA 102 restricts movement of the PCBA in the first perpendicular direction 130, thereby maintaining the coupling between the multi-pronged snap 128 and the PCBA 102.

As stated above, each prong 128A, 128B is formed from the base deck 104 and, therefore, may be made from metal (e.g., aluminum, steel). Due to being formed from metal, each prong 128A, 128B may be flexible. The flexibility of the prongs 128A, 128B may facilitate coupling of the PCBA 102 to multi-pronged snap 128. That is, due to the flexibility of the prongs 128A, 128B, the prongs 128A, 128B can be biased towards the multi-pronged snap's centerline 158. Being biased towards the multi-pronged snap's centerline 158 facilitates sliding the PCBA mounting holes 126 over the distal portion's outermost exterior surface 146. Furthermore, after the PCBA mounting holes 126 slide over the distal portion's outermost exterior surface 146 and into the indentation 168, each prong 128A, 128B can resume its initial orientation relative to the multi-pronged snap's centerline 158. That is, the prongs 128A, 128B can flex back away from the multi-pronged snap's centerline 158.

In at least some embodiments, the proximal portion's exterior surface 170 may be tapered towards the multi-pronged snap's centerline 158 as the proximal portion's exterior surface 170 transitions from the catch 140 towards the proximal portion's base 172. Due to the tapering of the proximal portion's exterior surface 170, less material is included at the proximal portion's base 172. Therefore, less force may be required to slide the PCBA mounting holes 126 over the distal portion's outermost exterior surface 146 because the prongs 128A, 128B may bias towards the multi-pronged snap's centerline 158 more easily.

Additionally or alternatively, the prong's interior surface 174 may be tapered away from the multi-pronged snap's centerline 158 as the prong's interior surface 174 transitions from the distal end 176 towards the proximal portion's base 172. Similar to above, the tapering of the prong's interior surface 174 results in less material being included at the proximal portion's base 172. Therefore, less force may be required to slide the PCBA mounting holes 126 over the distal portion's outermost exterior surface 146 because the prongs 128A, 128B may bias towards the multi-pronged snap's centerline 158 more easily.

In at least some embodiments, the multi-pronged snap's center portion 178 may be depressed and/or form a cavity relative to the base deck surface 150. The depressed and/or cavity of the multi-pronged snap's center portion 178 may facilitate the flexibility of the prongs 128A, 128B. Additionally or alternatively, the depressed and/or cavity of the multi-pronged snap's center portion 178 may reduce the likelihood that one of the prong 128A, 128B may break due to the greater angle between the prong's interior surface 174 and the multi-pronged snap's center portion 178.

Figure 3:
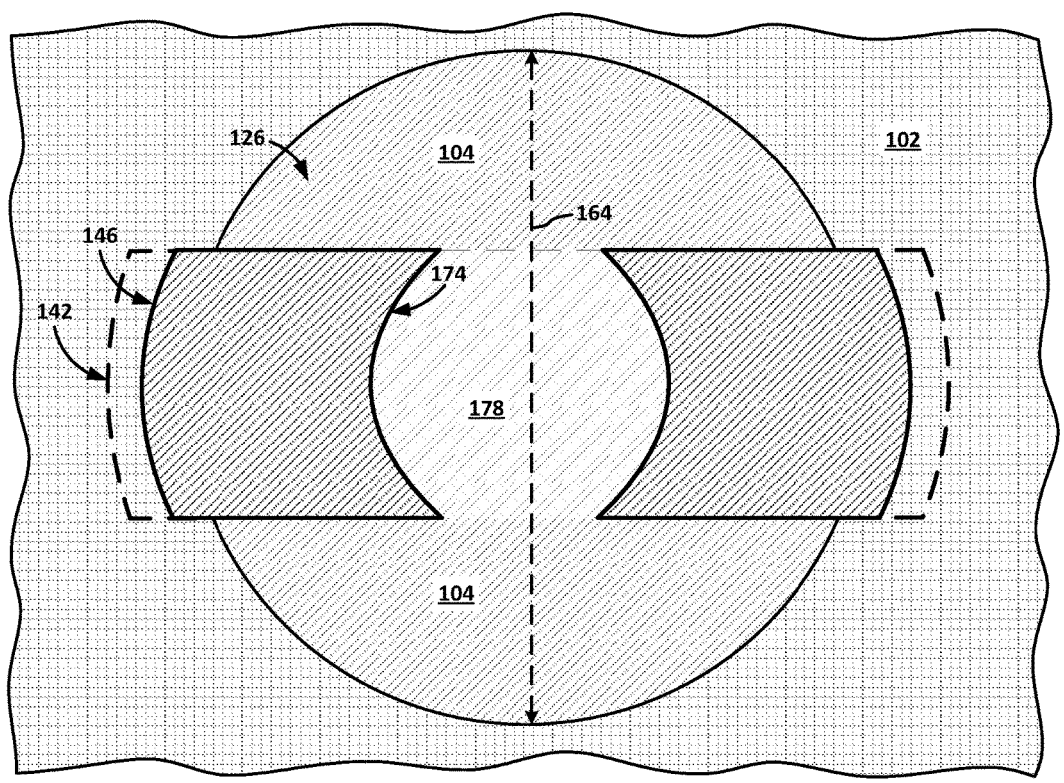
FIG. 3 shows a top view of the multi-pronged snaps from FIG. 2, in accordance with certain embodiments of the present disclosure.

Referring to FIG. 3, a top view of the multi-pronged snaps from FIG. 2 is shown. As illustrated, the prong's interior surface 174 may be curved. Similar to above, due to the curvature of the prong's interior surface 174, less force may be required to slide the PCBA mounting holes 126 over the distal portion's outermost exterior surface 146 because the prongs 128A, 128B may bias towards the multi-pronged snap's centerline 158 more easily.

Figure 4:
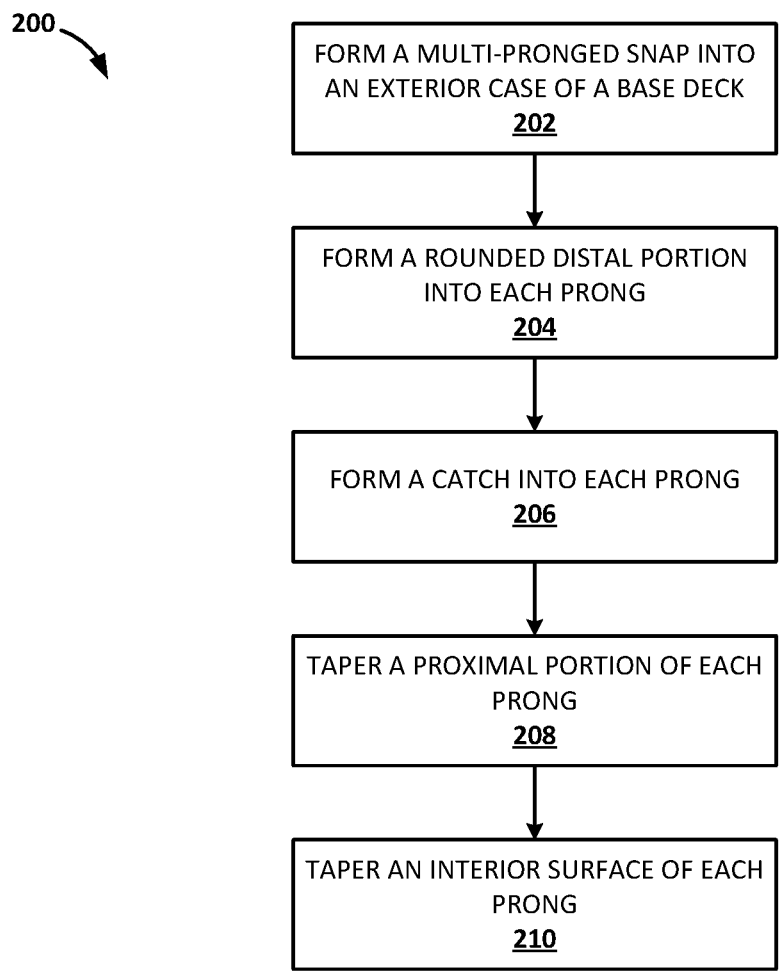
FIG. 4 is a flow diagram for a method of manufacturing a hard drive included a multi-pronged snap, in accordance with certain embodiments of the present disclosure.

FIG. 4 is a flow diagram for a method 200 of manufacturing a hard drive included a multi-pronged snap. The method 200 comprises forming a multi-pronged snap into an exterior case of a base deck (block 202). The base deck may have the same or similar characteristics as the base deck 104 depicted in FIGS. 1-3. Additionally or alternatively, the multi-pronged snap may have the same or similar characteristics the multi-pronged snap 128 depicted in FIGS. 1-3. For example, each prong of the multi-pronged snap may be formed to have a height that is greater than the height of the exterior case of the base deck. As another example, the multi-pronged snap may be formed to have two prongs. As even another example, the multi-pronged snap may be formed to have more than two prongs.

The method 200 further comprises forming a rounded distal portion into each prong of the multi-pronged snap (block 204). In embodiments, the rounded distal portion may have the same or similar characteristics as the distal portion 134 depicted in FIG. 2. For example, the rounded distal portion may be formed to taper towards a centerline of the multi-pronged snap as the rounded distal portion transitions away from a center portion of the rounded distal portion. As another example, the rounded distal portion may be formed to have a height that is less than half the height of the multi-pronged snap.

In at least some embodiments, the method 200 further comprises forming a catch into each prong of the multi-pronged snap (block 206). In embodiments, the catch may have the same or similar characteristics as the catch 140 depicted in FIG. 2. For example, the catch may be located proximal to the distal portion. As another example, the catch may extend parallel to a surface of the exterior case of the base deck.

In at least some embodiments, the method 200 further comprises tapering a proximal portion of each prong of the multi-pronged snap (block 208). In embodiments, the proximal portion may have the same or similar characteristics as the proximal portion 136. For example, the proximal portion may be formed so that it tapers towards a centerline of the multi-pronged snap as the proximal portion transitions towards a base of the multi-pronged snap.

In at least some embodiments, the method 200 further comprises tapering an interior surface of each prong (block 210). In embodiments, the interior surface may have the same or similar characteristics as the interior surface 174 depicted in FIGS. 2-3. For example, the interior surface may be formed so that it tapers away from a centerline of the multi-pronged snap as the interior surface transitions from a distal end of the multi-pronged snap towards a base of the multi-pronged snap. The various forming approaches can be accomplished by machining, forging, molding, and/or the like.

Due to the embodiments disclosed herein, the need to secure the PCBA to the base deck using screws is reduced. Further, because the multi-pronged snaps disclosed in the embodiments herein may be integrally formed from the base deck, the need to find areas of the base deck that have adequate material for mounting bosses and/or screw threads is reduced. Further yet, a base deck with prongs reduces the overall number of components (e.g., fewer screws) required to assembly a hard drive. Even further, it may be easier or quicker to rework or disassemble a hard drive when the PCBA is coupled to the base deck by prongs rather than screws. As a result, some of the shortcomings of conventional ways for securing a PCBA to a base deck are eliminated.

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:

1. A base deck of a hard drive configured to house one or more components of the hard drive, the base deck comprising:
   a plurality of multi-pronged snaps integrally formed with the base deck, each prong of the plurality of multi-pronged snaps including:
   a rounded distal portion,
   a catch located proximal to the rounded distal portion, and
   a proximal portion located proximal to the catch, including an interior surface that tapers away from a centerline of the respective multi-pronged snaps as the proximal portion transitions towards a base of the multi-pronged snap, and including an exterior surface that tapers towards the centerline as the proximal portion transitions towards the base of the multi-pronged snap.

2. The base deck of claim 1, the rounded distal portion including a center portion, wherein the rounded distal portion tapers towards the centerline of the respective multi-pronged snaps as the rounded distal portion transitions away from the center portion.

3. The base deck of claim 1, wherein the catch extends parallel to an exterior surface of the base deck.

4. The base deck of claim 1, wherein each of the plurality of multi-pronged snaps includes two prongs.

5. The base deck of claim 1, wherein each of the plurality of multi-pronged snaps includes more than two prongs.

6. The base deck of claim 1, wherein a height of the proximal portion is 30-100 mils.

7. The base deck of claim 1, wherein a thickness of the proximal portion at the base deck is less than a thickness of the proximal portion adjacent the catch.

8. The base deck of claim 1, wherein the base deck includes a depressed area at a center of the plurality of multi-pronged snaps.

9. A method of manufacturing a base deck of a hard drive, the method comprising:
   forming a multi-pronged snap into the base deck;
   forming a rounded distal portion into each prong of the multi-pronged snap;

forming a proximal portion that is proximal to the rounded distal portion;

tapering an interior surface of each prong of the multi-pronged snap away from a centerline as the interior surface transitions from a distal end of the multi-pronged snap towards a base of the multi-pronged snap; and tapering an exterior surface of each prong of the multi-pronged snap towards the centerline as the exterior surface transitions towards the base of the multi-prong snap.

10. The method of claim 9, wherein the rounded distal portion tapers towards the centerline of the multi-pronged snap as the rounded distal portion transitions away from a center portion of the rounded distal portion.

11. The method of claim 9, further comprising forming a catch proximal to the rounded distal portion in each prong of the multi-pronged snap, the catch extending parallel to an exterior surface of the base deck.

12. The method of claim 11, wherein forming the multi-pronged snap into the base deck comprises forming the multi-pronged snap to include two prongs.

13. The method of claim 11, wherein forming the multi-pronged snap into the base deck comprises forming the multi-pronged snap to include more than two prongs.

14. The method of claim 9, wherein a height of the proximal portion is 30-100 mils.

15. A hard drive comprising:

a base deck coupled to a top cover to form an enclosure in which multiple hard drive components are positioned, the base deck comprising a plurality of multi-pronged snaps integrally formed with the base deck, each prong of the plurality of multi-pronged snaps including a rounded distal portion; and a printed circuit board assembly having a base-deck-facing surface and an external-facing surface opposite the base-deck-facing surface, the printed circuit board assembly is coupled to the plurality of multi-pronged snaps and includes a plurality of mounting holes that are tapered such that a diameter of the respective plurality of mounting holes is smaller at the base-deck-facing surface than a diameter of the respective plurality of mounting holes at the external-facing surface.

16. The hard drive of claim 15, wherein each of the plurality of multi-pronged snaps extends through one of the plurality of mounting holes.

17. The hard drive of claim 15, wherein each of the plurality of multi-pronged snaps includes a catch portion, wherein a first portion of the printed circuit board assembly directly contacts the catch portion, wherein a second portion of the printed circuit board assembly directly contacts the rounded distal portion.

18. The hard drive of claim 17, wherein a thickness of the plurality of multi-pronged snaps at the catch portion is greater than a thickness of the plurality of multi-pronged snaps proximal the catch portion.

19. The hard drive of claim 17, wherein the base deck includes a depressed area at a center of the plurality of multi-pronged snaps.

20. The hard drive of claim 15, wherein the printed circuit board assembly is positioned 30-100 mils away from the base deck.

* * * * *